United States Patent [19]

Andriussi

[11] Patent Number: 4,706,373
[45] Date of Patent: Nov. 17, 1987

[54] NUMERICAL-CONTROL MACHINING CENTER FOR STRUCTURAL SECTIONS

[75] Inventor: François Andriussi, Latresne, France
[73] Assignee: Promat Industrie, Latresne, France
[21] Appl. No.: 760,133
[22] Filed: Jul. 29, 1985
[30] Foreign Application Priority Data Aug. 8, 1984 [FR] France ............................. 84 12556

[51] Int. Cl.[4] ..................... B23Q 3/157; B23B 49/00; B23C 1/12
[52] U.S. Cl. ....................................... 29/568; 408/35; 409/191; 409/216
[58] Field of Search ............... 29/568, 39, 40; 408/31, 408/35, 36, 37, 38, 39, 40, 43, 46, 41, 42, 44, 53, 13; 409/201, 202, 216, 199, 191, 230

[56] References Cited

U.S. PATENT DOCUMENTS

| | | | |
|---|---|---|---|
| 2,722,161 | 11/1955 | Berthiez | 409/230 |
| 3,063,311 | 11/1962 | Beckwith et al. | 408/35 |
| 3,083,617 | 4/1963 | Swanson et al. | 409/211 |
| 3,094,015 | 6/1963 | Mead | 408/38 |
| 3,359,861 | 12/1967 | Johnson et al. | 409/216 |
| 3,460,435 | 8/1969 | Hucks et al. | 409/230 |
| 3,668,971 | 6/1972 | Dever | 409/202 |
| 3,703,027 | 11/1972 | Geyler | 29/39 |
| 3,730,635 | 5/1973 | Orendi | 408/46 |
| 3,823,645 | 7/1974 | Sukhov et al. | 409/201 X |
| 3,830,584 | 8/1974 | Ohlig et al. | 408/35 |
| 3,877,329 | 4/1975 | Noa | 29/568 |
| 3,909,923 | 10/1975 | Kurimoto et al. | 29/568 |
| 3,975,109 | 8/1976 | Frazierr | 29/46 |
| 4,061,064 | 12/1977 | Kindgren | 408/13 X |
| 4,080,853 | 6/1977 | Mizen | 408/46 X |
| 4,164,879 | 8/1979 | Martin | 29/568 |
| 4,187,608 | 2/1980 | Aldrin | 409/201 X |
| 4,589,174 | 5/1986 | Allen | 409/201 |

FOREIGN PATENT DOCUMENTS

| | | | |
|---|---|---|---|
| 68952 | 1/1983 | European Pat. Off. | 409/201 |
| 2723544 | 12/1978 | Fed. Rep. of Germany | 29/568 |
| 3216566 | 11/1983 | Fed. Rep. of Germany | 29/568 |
| 3327084 | 2/1985 | Fed. Rep. of Germany | 409/230 |
| 2167575 | 8/1973 | France | 408/38 |
| 636572 | 3/1962 | Italy | 408/35 |
| 186540 | 10/1983 | Japan | 409/197 |
| 1414081 | 11/1975 | United Kingdom | 29/568 |
| 1486524 | 9/1977 | United Kingdom | 29/568 |
| 2154162 | 9/1985 | United Kingdom | 408/35 |
| 1133068 | 1/1985 | U.S.S.R. | 409/203 |

Primary Examiner—William R. Briggs
Attorney, Agent, or Firm—Shenier & O'Connor

[57] ABSTRACT

The center comprises a conveyor, a motor-driven carriage equipped with a gripper to move a section (2) over the conveyor, along a numerical axis toward the fixed frame (7) of a machining station, and a vise (11).

In accordance with the invention, the machining station includes only the following: two moving elements (16, 21) adapted to move along cross-axes, the first said element (16) being movable relative to the fixed frame (7) and the second (21) being movable relative to the first (16), said second moving element (21) carrying a swivelling spindle head (25) equipped with at least one tool (5).

Also, the actuator (22) which controls the movement of each said element is a multipurpose actuator selectively controlled by the main numerical control program to execute either positioning-only commands, or feed-only commands, or combined commands, among others.

9 Claims, 14 Drawing Figures

NUMERICAL-CONTROL MACHINING CENTER FOR STRUCTURAL SECTIONS

This invention concerns a numerical-control (N/C) machining center for machining (punching, drilling, tapping, spot facing and so on) structural members or sections.

Such machining centers are already known, in particular from French patent application 2,167,575, and comprise a conveyor to support each section, a motor-driven carriage controlled by the N/C system, a carriage-mounted gripper to grip and move the given section along the X-axis, at least one vise for clamping the section against motion in the machining station, a stationary frame at said station, at least one working tool and means guided on the fixed frame and motor-driven, under N/C control, as concerns some of the means, for positioning and tool feed purposes along angular Y and Z axes located in a plane which is preferably at a right angle to the X-axis.

Most commonly, the machining operation involves drilling and, if the section to be drilled is a channel (U-section) or I-beam and the like, drilling can be done perpendicularly to the web and to the two flanges, in other words, from above said section, downwards, from the right, leftwards and from the left rightwards.

For this reason, the known machining centers comprise three machining units imparting six motions (three positioning and three cutting motions) to three drills. Thus, the fixed frame is a gantry-type device straddling the conveyor and consisting of two columns connected by a crosshead. The crosshead is adapted to slidably carry a horizontal carriage driven by a positioning actuator, which may be mechanical, electric, hydraulic, pneumatic or other, and a vertical drilling spindle or rotating tool-holder is operable to move relative to said carriage, driven by a drilling feed actuator. A vertical slide driven by another positioning actuator (mechanical, electric or other) is adapted to slide between the two columns and a horizontal drilling spindle is operable to move relative to said vertical slide, driven by a drilling feed actuator.

The positioning actuators perform a very specific specialized function—that of moving a slide with a relatively small amount of power over a broad speed range (fast advance, slow feed and accurate stop).

These positioning actuators thus possess highly specific characteristics in terms of both functions and system integration. They are in fact piloted by the machining center's N/C control which supplies positioning set points in accordance with the set program. Position sensors placed along the slide's path also supply signals indicating the actual position which has been reached. The N/C controller or computer compares the actual position with the set position. The numerical control then controls the transmission of the above-mentioned commands—start, continue rapid approach, start slow approach, stop and lock—to the appropriate slide, based upon the deviation measured by the comparison.

The drilling feed or feed rate actuators are not servoed to the N/C control as are the positioning actuators. Instead, they are controlled directly by one or more rotational speed, torque or thrust detectors and thus do not depend on a program run by the N/C system. This results in less flexibility for these actuators and in a certain amount of dead time during tool changes. In fact the latter actuators fulfill a specialized function which differs greatly from that of the positioning actuators, and which consists in advancing the drill at high power and limited speed during machining. They are therefore designed differently in system and functional terms from the positioning actuators.

It is the object of the present invention to simplify the above-described machining center in view of both lowering its cost and increasing its degree of automation to make it completely autonomous once the programs required for a given machining cycle have been loaded.

To this end the invention provides a machining center wherein the positioning and feed control means consist only of a single machining unit which in a known way, especially as taught by German patent specification 3,216,566, comprises two crossed moving elements, the first being movable in relation to the stationary frame and the second being movable in relation to the first, said second element carrying a swivelling tool head with at least one tool. Moreover, the actuator driving each moving element is a multipurpose actuator designed specifically to be able to advance at low power over a wide range of speeds with great accuracy for positioning purposes and/or advance at high power and limited speed for machining purposes, said actuator for each moving element being therefor controlled by the N/C control in a selective manner in the context of its general program to execute, in particular, positioning-only commands, feedrate-only commands or combined commands, thus enabling this single-unit machining unit with two traversing elements equipped with swivelling heads to work on at least two angular faces of the section by selecting the element to which the positioning commands are addressed and the element to which the feedrate commands are addressed.

As such, this special combination makes it possible to eliminate two tool heads and four movements; further, it enables numerical control of both positioning and machining or feedrate.

According to an especially advantageous embodiment, said first moving element moves along a horizontal axis and said second moving element moves along a vertical axis. In addition, the swivel head can be a turret with four drilling spindles arranged in mutually perpendicular pairs, preferably all rotatively driven together.

For machining operations such as drillings which must be carried out parallel to the traverse axes, the numerical control is organized so that the first and second moving elements can be controlled indifferently such that either one can carry out either the positioning or the feed commands.

For machining on a slant with respect to the movement axes, the numerical control is organized to control at least either one of the two moving elements for positioning action as defined on the basis of the computed starting position of the machining stroke and to control both moving elements for coordinated feed according to the slope of the machining stroke, as required.

The fact that the N/C control operates both moving elements, whether separately or jointly in cooperation, opens the machine to further capabilities simply by variously combining said moving elements and even the swivel head if required.

A first complementary function consists in determining the reference surface within the section to be drilled in relation to which the gauge line must be measured by the numerical control. So far, the machining center includes a probe, electrical or other, which is fixed relative to the support of one of the horizontal drilling spindles. Continuing this assumption, the probe's distance from the flange of the section is constant and at a maximum, since it is determined for the largest machinable section. As long as the section involved is a heavy one, this is not a drawback, since detection based on a positioning movement is carried out near the flange-to-web fillet radius. However, in the case of a small section it is a drawback, for the detection is carried out too far from the flange and may involve an error that will adversely affect tool positioning accuracy. To obviate this disadvantage, the probe should be positioned according to the cross section of the steel section during machining. Some machining centers provide this capability, but only through manual adjusting means which increase noncutting time and interfere with full automation of the center.

The machining center according to the invention makes it possible to carry out this adjustment fully automatically under numerical control. To this end, the retractable probe is carried by the second moving element, on a swivel arm enabling detection from either the right side or the left side, such that the first moving element carrying said second moving element and controlled by the N/C system to execute the positioning commands brings said probe to the distance from the flanges of the section which is the most suitable for measuring purposes and said second moving element, also under N/C positioning control, brings said probe into contact with the web of the section, at which point the contact dimension is taken into account by the N/C processor to determine the origin of the measurements subsequently defined by the positioning set points, after which, the probe is retracted and the two moving elements are numerically controlled by positioning and machining set points to execute a new machining cycle.

A second complementary function consists in detecting actual tool length and storing said tool length value automatically under N/C control.

In the machining centers known hereto, the N/C positioning commands take into account actual tool length at each tool change, especially for drills. The known way of measuring this length is by using an electric probe fitted to a drilling spindle and manually moving the tool-holder slide to make contact, the tool length thus measured being stored in the N/C positioning controller memory. However, this cycle is not automatic and involves considerable downtime.

The machining center according to the invention enables full automatic, N/C controlled tool length detection, measurement and storage.

The inventive means used for this purpose comprise the probe just mentioned and the center N/C control enables orienting the spindle head, moving it in front of the probe by means of the second moving element controlled according to a specially addressed feedrate set point and moving it towards the probe by means of the first moving element controlled according to a specially addressed positioning set point in order to measure immediately at the time of contact the difference in stroke length compared with a reference tool or the lack of a tool.

A third complementary function is automatic tool changing capability. Hereto, the tool changer has been a separate, self-contained device requiring to be connected to the center's N/C control for operation. By said third function, the tool changer can be reduced to the tool magazine and to the means for removing and loading the tools in its location. All remaining tool changer means are those of the center itself and automation is controlled by the center and its N/C control.

The machining center according to the invention comprises a tool magazine the compartments whereof are arranged so that their direction of tool storage and their direction of mutual alignment are parallel to the axes of the first and second moving elements, the rotating spindle or spindles of the swivel head being equipped with a self-loading chuck with a free-sliding unlocking sleeve and the magazine cooperating with a swivelling locking/unlocking comb actuated by means such as a cylinder actuator, said comb being operable to push back the sleeve of the selected spindle chuck by cooperating with the previously-mentioned moving elements which, under N/C control giving them each particular positioning instructions, bring said spindle in front of the selected compartment of the magazine to deposit therein or pick up therefrom a tool and also move said spindle towards and away from said comb.

Various other features and advantages of the invention will become apparent from the detailed description which follows.

A preferred embodiment is illustrated by way of example in the appended drawing in which.

Figure 11:
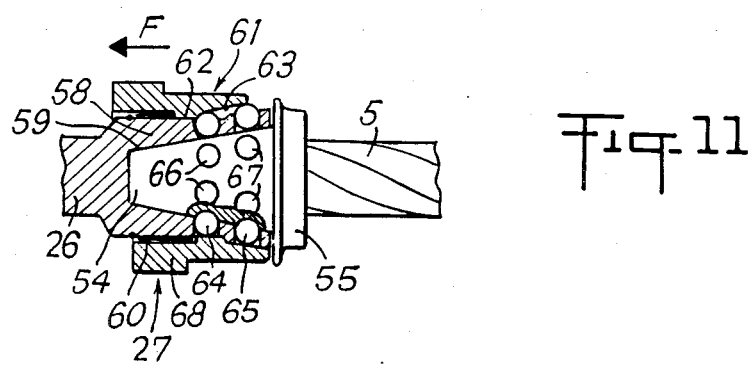

and FIG. 11 is a section through a drill chuck type operable to cooperate with the above-mentioned comb, said chuck being shown in unlocked and locked positions respectively in the top and bottom half sections of the figure.

The drilling center represented in the drawing comprises a freewheeling roller conveyor 1 designed to support each steel section 2 to be drilled. The section is movable in the directions of its longitudinal axis, hereinafter designated the X-axis, by means of a motor-driven carriage 3 carrying a gripper 4 designed to securely grip the end of said section to transmit movement thereto without slip. Carriage 3 is driven by a motor acting through a rack and pinion device which also provides an accurate measurement of positions. Said motor is controlled by the center's N/C system which stores X-axis positioning set points. In other words, the center comprises a numerical X-axis thanks to which the section 2 can be positioned with high accuracy in front of a drill 5.i located in a drilling station 6 through which said section moves.

The drilling station 6 comprises a stationary frame 7 basically consisting of a cross head 8 spanning a conveyor 1 orthogonally to its axis X. In the embodiment illustrated, the crosshead is supported by two columns 9, 10 with boxes, standing to either side of the conveyor and of a vise 11. The vise has a fixed jaw 12 and a movable jaw 13 for clamping controlled by the N/C system in relation with the X-axis. The jaws are V-shaped to allow passage of the moving gear carrying the drills 5 and to each grip the section 2 on both sides of the moving gear.

The crosshead 8 carries a slideway with two rails 14, 15 which, in the illustrated example, are round bars. The rails provide guidance in translation along the transverse axis, hereinafter termed the Y-axis, of a carriage 16 which is equipped for this purpose with bearings 14a, 15a of the circulating ball type or other known type. Carriage 16 is driven by a motor 17 which drives a pinion gear 18 cooperating with a rack 19 attached to the crosshead 8, said drive or actuator 17 through 19 also providing precise position measurements. Motor 17 is controlled by the overall N/C control which has in storage Y-axis positioning set points and feedrate set points for the same axis. Thus the center has a numerical Y-axis which is not specialized but rather is multifunctional, since it can execute, as part of the main N/C program, either positioning-only instructions, or feed-only instructions, or other particular instructions described subsequently herein, for example to determine the origin of measurements of any given section, to measure the tool length of the drill being used, to change drills, and so on. Accordingly, motor 17 possesses universal characteristics combining power and accuracy, a very wide speed range and great flexibility of operation, etc.

Carriage 16 carries a slideway 20 for guiding in tranlation along the vertical or Z-axis a slide 21. Slide 21 is driven by a motor 22 driving a pinion 23 whick cooperates with a rack 24 attached to the carriage 16. The slide 21 motor 22 features the same universal characteristics as the motor 17 of carriage 16. In addition, the drive 22 through 24 or actuator is controlled by a numerical axis Z acting under main N/C program control to execute Z-axis positioning set points or tool feed set points or other particular instructions as mentioned in the foregoing.

Carriage 16 and slide 21 thus constitute two mutually crossed moving elements whose motions are controlled by the numerical Y and Z axes selectively carrying out the previously-mentioned positioning and tool feed instructions. The main program mobilizes these numerical axes to obtain the operating sequences described hereinafter.

Figure 3:
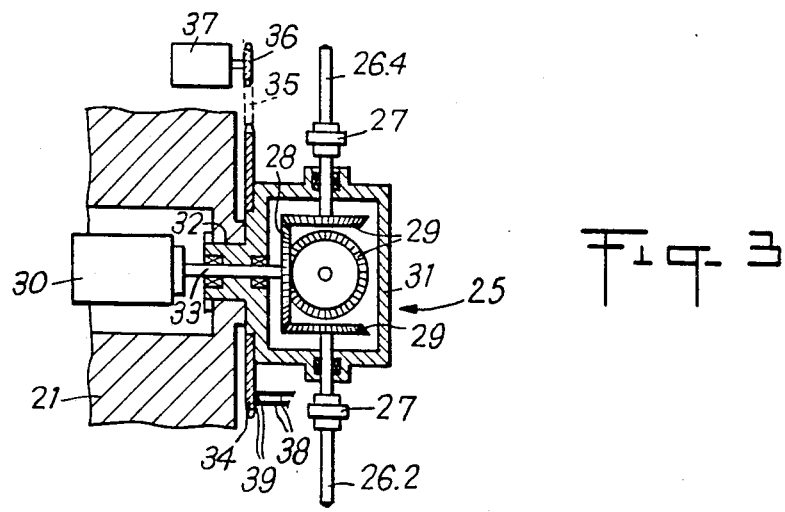
FIG. 3 is a schematic sectional view of the swivelling drill head taken along line III—III of FIG. 2.

Finally, slide 21 carries a swivelling drill head 25 which, in the example under consideration, is equipped with four drilling spindles 26.1 to 26.4 extending radially and perpendicularly to one another. Said spindles are equipped with chucks 27 (FIG. 11) for chucking drills 5.1 to 5.4. They are rotatively driven synchronously together by means, for example, of a common, driving crown gear 28 permanently meshed with bevel gears 29 journaled on the spindles (FIG. 3); said crown is coupled to a variable speed drive apparatus 30 mounted on slide 21.

As a further feature, the spindle head gearbox 31 is rotatively mounted relative to slide 21 by means of a cylindrical bearing surface 32 concentric with the shaft 33 of the driving crown gear 28. Orientation of gearbox 31 to present the selected drill 5i as required to drill section 2 is controlled by a sprocket wheel 34 connected by a chain 35 to a pinion 36 coupled to a motor 37. This device as a whole is also an actuator and the power supplying of motor 37 is controlled by the main N/C program which also determines the rotational speed of drive 30 among other devices. The N/C control cooperates with position sensors 38 disposed facing tracks 39 on sprocket wheel 34, which enable the actual angular position of head 25 to be determined. A locking device, not shown, locks said head when said angular position is the same as that given in the main program.

Thus, the machining center comprises only the following: a horizontal carriage 16 movable in translation along the Y-axis, a vertical slide 21 movable in translation along the Z-axis and a swivelling spindle head 25. The numerical control system controls all three of these motions, as will now be described with reference to FIGS. 4 through 7, keeping in mind that each of the numerical axes Y and Z can equally follow particular positioning, feedrate or other instructions as part of the overall cycle program.

Figure 4:
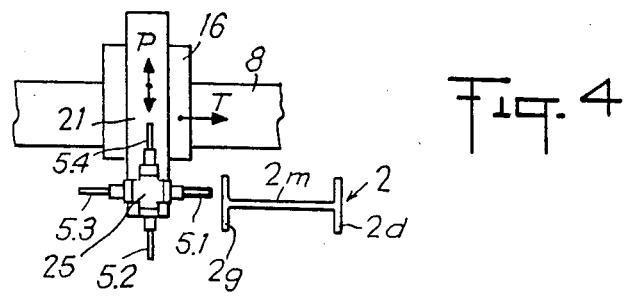
FIGS. 4 through 7 are schematic views similar to that of FIG. 2 showing the N/C-controlled positioning and feed movements of the two moving elements and the swivel head for the respective purposes of drilling the left flange, the web and the right flange of the section parallel to the N/C axes and drilling at an angle to said axes.
Figure 5:
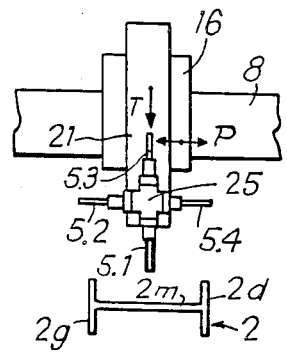
Figure 6:
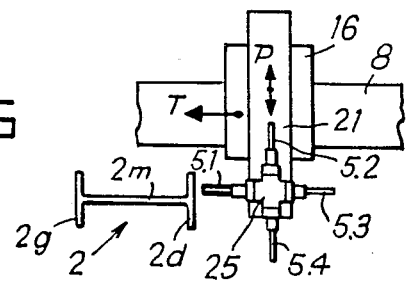

In the example illustrated in FIGS. 4 through 6, the job consists in drilling holes in an I-beam section 2 with two flanges, ie. a righthand flange 2d and a lefthand flange 2g, whose centers are joined by a web 2m, said holes to be drilled by the moving assembly consisting of elements 16, 21 and 25 alone. The drilling operation will be described only in terms of drill 26.1, such that only a single hole diameter is involved.

Under main program control, carriage 16 moves to a position to the left of the section 2 to being drilling the left flange 2g of said section (FIG. 4). Spindle head 25 swivels to the required orientation to direct drill 5.1 to the right in a horizontal plane. Slide 21, in keeping with positioning instructions P on N/C axis Z, moves down or up in search of the drilling height and locks on reaching the exact set level. Thereafter, carriage 16, following the drilling feedrate program instructions T for the Y-axis, moves toward the right with its drill 5.1 rotating at the required speed, as determined by the main program instructions which selected it in the first place. On completion of the hole, carriage 16 moves back to the point where drill 5.1 has cleared the workpiece. If the machining program defined by the X-axis does not call for further drilling in this location, the cycle continues and proceeds with locating the next drill point in the right flange 2d.

Slide 21 continues its upward stroke and carriage 16 resumes its traverse to the right under main program control so that drill head 25 clears the section 2. As shown in FIG. 6, head 25 is swivelled, with all drills 5 rotating, so that drill 5.1 comes to be horizontally directed to the left. Slide 21, responding to the Z-axis positioning instructions P, moves down or up until it reaches the drilling level through rapid positioning advance and slow, precision positioning, then stops. Carriage 16, responding to the Y-axis drilling feedrate instructions, traverses to the left as its drill 5.1 rotating at the required speed as determined by the main program instructions which selected it in the first place. On completion of the hole, carriage 16 moves back to the point where drill 5.1 has cleared the workpiece and if no further drilling is required for the time being in the X-plane, the moving assembly 16, 21, 25 becomes available for another cycle carried out in another transverse plane following unclamping of the drilled section 2 by vise 11, displacement of said section 2 by numerical axis X and reclamping.

In the cycle just described, spindle head 25 operates with only one drill (5.1) things proceed as though said head had only a single drilling spindle which can be swivelled in 90° steps to point the drill in any of the three previously stated directions: to the right, down, and to the left.

In the embodiment shown however, the head includes four spindles 26.1 to 26.4 able to hold four different drills 5.1 to 5.4. Accordingly, head swivelling in going from one drilling step to the next (FIGS. 4–5 or 5–6) takes into account not only the new orientation of the drill, but also the orientation during the step just completed of the drill selected for the next step. The specific direction of swiveling in each case is controlled by the main program.

Continuing the operating description for the illustrated embodiment, head 25 swivels in 90° steps, given that the carriage 16 and the slide 21 are mutually perpendicular. However, if said two moving elements 16 and 21 cross at any other angle, the control of the head is servoed to said angle so that the selected drill 5 will be directed, after swivelling, at a right angle to the drilling surface.

Figure 7:
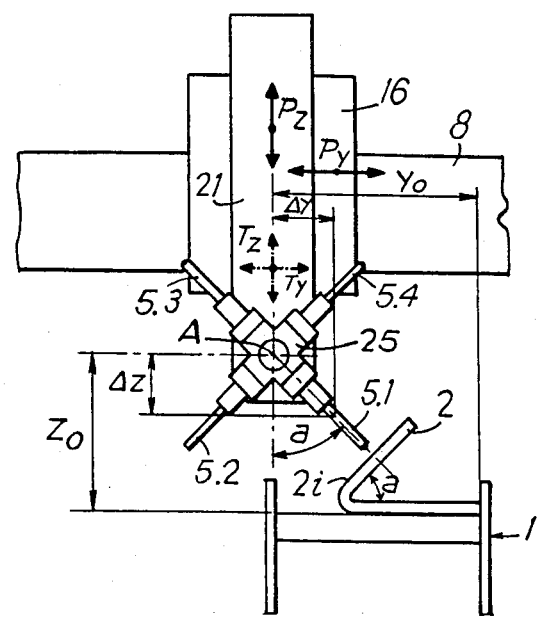

In fact, in general, irrespective of the crossing angle of the moving elements 16 and 21, it is possible to drill at a slant; for example and as FIG. 7 shows, it is possible to drill perpendicularly into the oblique flange 2i of a V-section. In this case, the N/C processor would determine the point A at which the swivel axis of the spindle head 25 must be positioned so that the selected drill 5.1, advancing in its axial direction after the said head has been oriented according to the angle "a", which is the angle of flange 2i of the section, will drill said flange at the designated point in the plane. The processor having determined the Yo and Zo coordinates of this point A in relation to the reference planes of the conveyor 1, the numerical Y-axis traverses carriage 16 to accurate coincidence with dimension Yo and the numerical Z-axis moves slide 21 to coincidence with dimension Zo. The Y and Z numerical axes act in response to the positioning instructions Py and Pz from the processor.

It is now necessary, the head 25 being oriented to angle "a", for the numerical Y and Z axes to control the carriage 16 and the slide 21 to advance in a coordinated manner following the rule $\Delta Y/\Delta Z = \tan a = Vy/Vz$.

Said numerical Y and Z axes have obeyed the feedrate commands Ty and Tz defined by the processor and the associated advances are continuously monitored by the Y and Z position sensors taking measurements at the shortest possible regular intervals. Said intervals may for example be on the order of every 1/100th mm and the advances can be corrected at the same frequency.

The drilling center can also carry out additional functions involving its moving elements 16, 21 and its spindle head 25 in conjunction with the numerical Y and Z axes, mainly, which control them (with the numerical control system also being involved through its main program set points).

Figure 8:
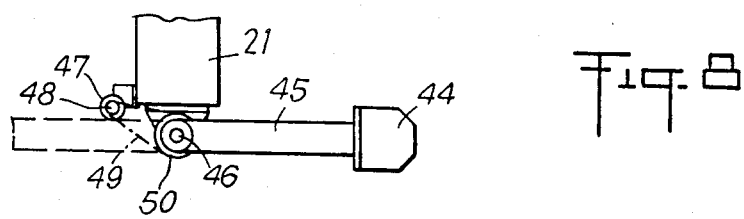
FIG. 8 is a top view taken at line VIII—VIII of FIG. 2 of the probe which defines the origin of the vertical positionings relative to any given structural section.
Figure 10:
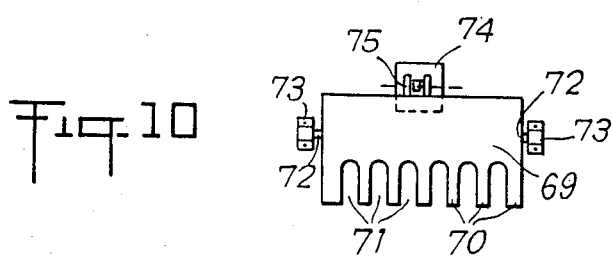
FIG. 10 is a top view on a smaller scale, taken at line X—X of FIG. 9, showing the tool changer comb which effects the locking and unlocking of a tool in relation to the drill spindle which has been brought in front of the selected compartment of the magazine by the numerical control.

Three such additional functions or capabilities will now be described by way of non-limiting examples with reference to FIGS. 2 and 8; 2; 2, 9A to 9D, 10 and 11 respectively.

A first complementary capibility consists in determining the location in the section 2 to be drilled of the reference plane 40 (FIG. 2) with respect to which the drill holes are dimensionally located and are to be measured by the numerical Z-axis. The distance from the riding plane 41 of the conveyor 1 to said reference plane 40 depends on the shape of the section 2 whose standard dimensions have been memorized. But due to the fact that the section is not perfectly straight and that the holes must be drilled with a high accuracy, it is conventional in drilling centers to detect the top surface 42 of the web 2m and subtract from its height dimension half the thickness of the web to obtain the origin of the measurements to be stored in the memory for the numerical Z-axis.

Figure 1:
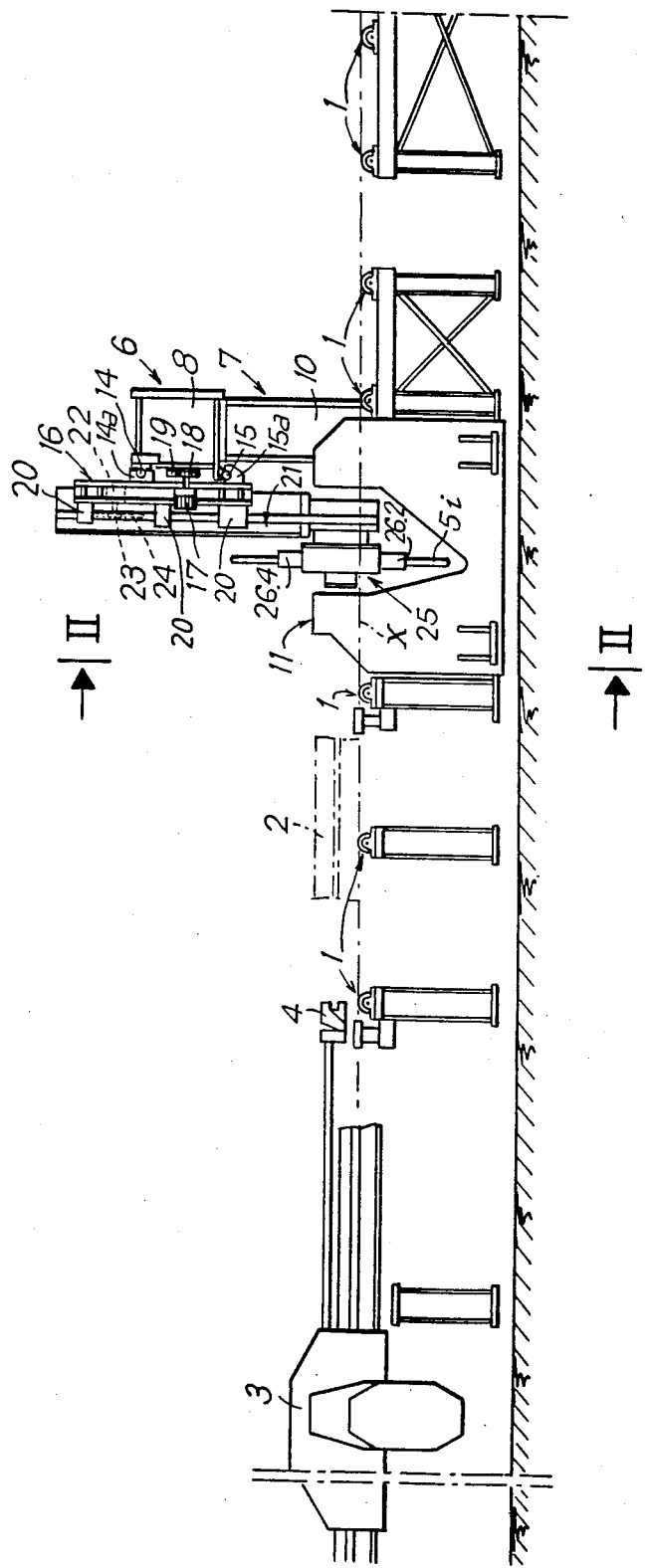
FIG. 1 is a side elevation of a structural section drilling center according to the invention.
Figure 2:
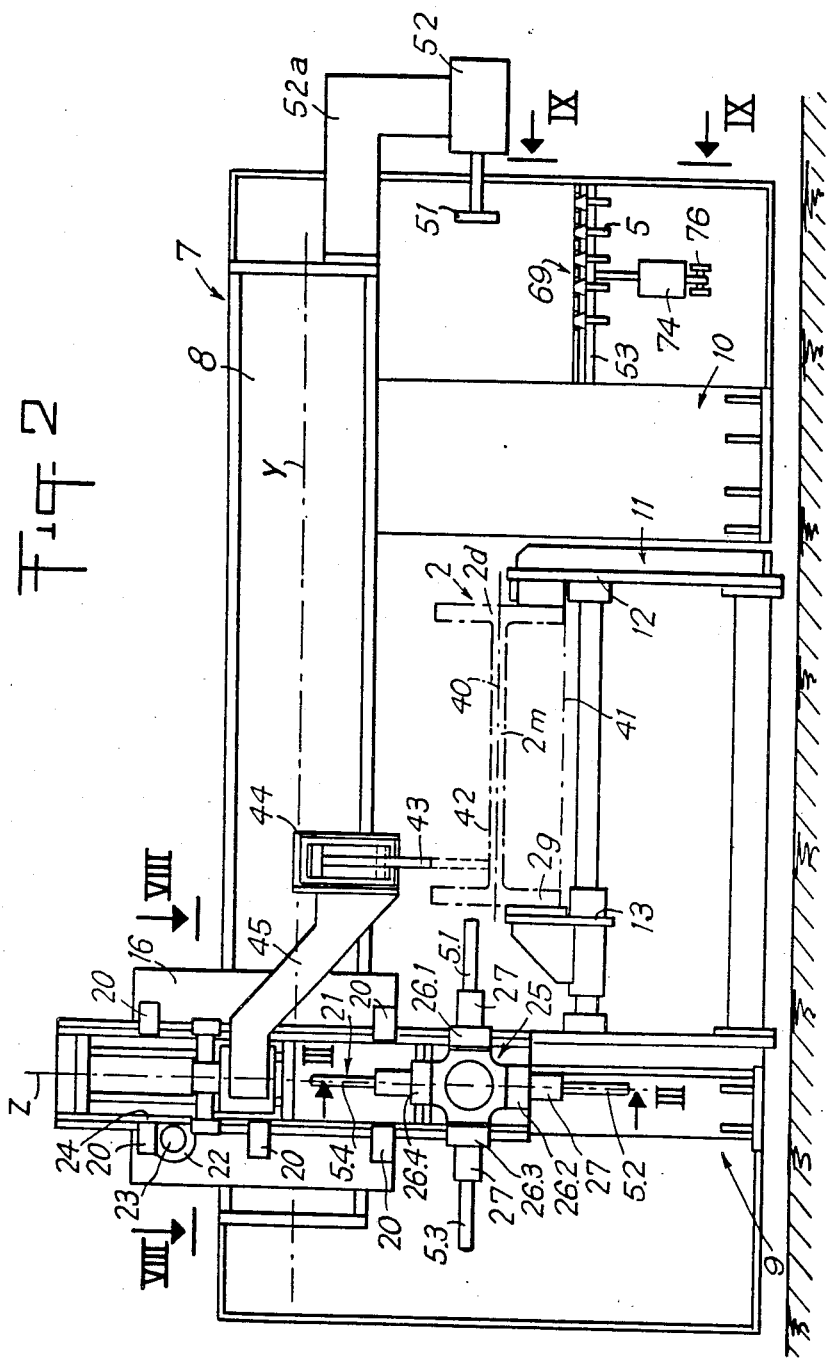
FIG. 2 is a front elevation, drawn to a larger scale, taken across line II—II of FIG. 1.

The drilling center thus has a probe 43 which is preferably an electrical type and retractable into a housing 44, this retracted position being represented in solid lines and the extended position in broken lines in FIG. 2. In accordance with the invention, the housing 44 is carried at the end of a swivel arm 45 whose other end is fitted to a shaft 46 (FIG. 8) rotatable with respect to vertical slide 21. Said arm 45 is operable to be located in either of two positions on an alignment parallel to the machine crosshead 8. In one of the positions, outlined with a solid line in FIGS. 2 and 8, the arm 45 is moved to the right such that the probe 43 operates as close as possible to the left flange 2g of the section when the moving assembly in configured as in FIG. 4, whereas in the opposite position incipiently drawn in broken lines in FIG. 8, the arm 45 is moved to the left so that the probe 43 will operate as close as possible to the section's right flange 2d when said moving assembly is configured as in FIG. 6. An actuator is provided, consisting of a motor 47 whose output shaft is coupled to a pinion 48 connected via a chain 49 to another pinion 50 journaled to the shaft 46 of arm 45, to drive the arm 45 between its two positions.

Assuming that holes are to be drilled in the left flange 2g of the section, the probe will move to take dimensions in the following way: the main N/C program brings about the positioning of arm 45 as per FIGS. 2 and 8; these same program instructions, knowing the cross section of the member 2 to be drilled have in store the distance between the probe 43 and the fixed, reference jaw 12 of the vise 11 so that the probe can operate as close as possible to the fillet joining the left flange 2g to web 2m. As soon as this distance is known, numerical axis Y is notified by means of particular positioning set points enabling the carriage 16 to be traversed until said probe 43 has reached the selected position. Thereafter, similarly "particular" positioning instructions are sent to the numerical Z-axis to lower slide 21. Probe 43 being extended for operation, sends a signal to the N/C processor as soon as the probe makes contact with the top surface 42 of the web 2m, so that the processor can determine the origin of the measurements to be made during the drilling phase, illustrated by FIG. 4. Said origin having been placed in storage, the probe 43 is retracted and the moving assembly 16, 21, 25 operates as described in the foregoing with reference to FIG. 4. To carry out the drilling step represented in FIG. 6, the same detection of the origin or gauge line for measurements is carried out near the right flange 2d, but the arm 45 in this case extends in the opposite direction as shown with broken lines in FIG. 8.

A second complementary capability consists in detecting the actual length of a drill and storing the tool length value automatically under N/C control. For this purpose, as can be seen from FIG. 2, a probe 51, preferably electrical in nature, is slidably mounted on a damper in a housing 52 which is secured by means of a supporting member 52a at the end of crosshead 8. Said probe 51 is adapted to move parallel to the crosshead. A specific main program instruction can now bring about the orientation of spindle head 25 so that the drill to be measured extends horizontally to the right and the N/C memory is called upon to take into account the subsequent measurements concerning said drill. To carry out this measurement of tool length function, a "particular" or dedicated feedrate instruction is given to the numerical Z-axis and causes slide 21 to slide vertically until said selected drill reaches the level of probe 51. Finally, a particular or dedicated positioning instruction is sent to the numerical Y-axis to traverse carriage 16 to the right and downcounts its movement, for example based upon an origin associated with the absence of a tool in the spindle or with a reference drill in said spindle. The measurement taken when probe 51 sends its contact-signal in this case corresponds to the effective length of the drill. This length value is taken into account by the N/C memory in determining the positioning strokes for the machining phases as per FIGS. 4 through 7.

A third complementary capability is automatic tool changing. In keeping with the invention, the tool changer is simplified by using as driving means the moving assembly 16, 21, 25 of the machining center together with its associated numerical control.

The tool changer comprises a magazine 53 (FIGS. 2 and 9A-9D) designed to receive drills 5 or other tools with tapered, cylindrical shanks 54 with an intermediate flange (FIG. 11) 55. Magazine 53 is a horizontal plate fast with a vertical mounting bend 56. Said plate is provided with holes 57 into which the drills 5 are normally deposited to rest therein, shank-up by their mid-length flanges 55 on said plate. Holes 57 thus constitute tool storage compartments having a vertical axis parallel to N/C axis Z and being arranged in a row parallel to the Y-axis.

Magazine 53 is designed to be served by the center's moving assembly 16, 21, 25 whose chucks 27 on rotating spindles 26.1 to 26.4 of head 25 are automatic locking/unlocking types not requiring spindle rotation to stop for operation. A chuck of this type is shown in greater detail and by way of example in FIG. 11. It comprises a hollow body 58, providing a recess 59 accommodating the shank 54 of a drill 5. A control sleeve 61 is fitted freely in both rotation and translation around body 58 by means of a ball bearing 60. Said sleeve 61 has a cylindrical bore 62 and a divergent conical bore 63 forming two bearings to actuate two ball rings 64 and 65, which are captive but have some radial play in body 58. When said control sleeve 61 is in locked position (bottom half of FIG. 11), said balls 64 and 65 are pushed back towards the center by bearing surfaces 62 and 63 and sink into dimples 66 and 67 in the shank 54, thus coupling the latter to chuck body 58. Conversely, when said sleeve 61 is in unlocked position (top half of the figure) balls 64 and 65 are applied by centrifugal force and possibly by elastic means against conical bearing surface 63, thus escaping from dimples 66, 67 and breaking the above-mentioned coupling. To change from locked to unlocked configuration, only requires sliding the sleeve 61 axially in the direction of arrow F, while locking is accomplished by sliding said sleeve in the opposite direction. The sliding action can be imparted to the sleeve 61 thanks to the circular boss 68 thereon.

Tool changer magazine 53 cooperates with a reciprocating comb 69 (FIG. 10) whose teeth 70 are separated by cutouts 71. To unlock a drill 5, sleeve 61 must be inserted into the selected cutout 71 and the adjacent teeth 70 of said cutout must be applied to the boss 68 on said sleeve to raise the latter whilst the chuck body 58 continues to rotate at a constant level. The comb 69 is swivelably mounted on shafts 72 in its middle portion, carried by fixed bearings 73. Said bearings are arranged so that the cutouts in the comb are always located in front of the holes or compartments 57 in the magazine. The back of the comb opposite the teeth is connected to an actuating means such as a cylinder 74, the sliding elements whereof—cylinder and piston rod—are articulated by a spindle 75 on the back of the comb and by a spindle 76 on the fixed frame (FIGS. 2, 9A-9D and 10). Actuating means 74 swivels the comb 69 so that it is either inclined upwards (FIGS. 9B, 9C) or downwards (FIGS. 9A, 9D) with respect to the tool holder plate.

An automatic tool changing operation will now be described with reference to FIGS. 9A through 9D, in which the chuck 27, the tool 5, the magazine 53 and the comb 69 are drawn highly schematically for greater clarity of the individual steps. For instance, the tool flange 55 and the sleeve flange or boss 68 are omitted from the drawing although they are referred to describing this tool changing cycle.

Figure 9A:
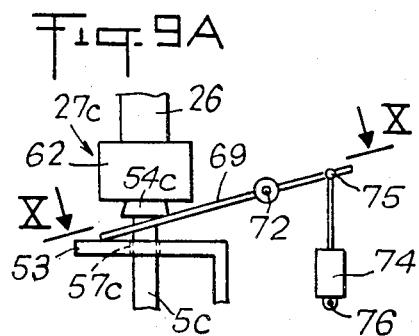
FIGS. 9A through 9D are schematic views, drawn to a larger scale, of the part of FIG. 2 behind line IX—IX of that figure summarizing the steps in a tool change.

The particular tool changing instructions of the main N/C program select the drill to be changed 5c and the hole or compartment 57c of the magazine in which said drill must be dropped. Said particular instructions or set points call upon the swivelling spindle head 25 to place the spindle 26 of drill 5c in a vertical, downward position and also call upon the comb 69 to place it down-inclined position (FIG. 9A). The same particular instructions are transfered to the numerical Y and Z axes to traverse carriage 16 to the point where drill 5c is facing hole 57c and to move slide 21 to the point where said drill 5c is engaged in said hole 57c; in the latter position, the circular flange 68 of the chuck sleeve 61 on chuck 27c comes close to comb 69.

Figure 9B:
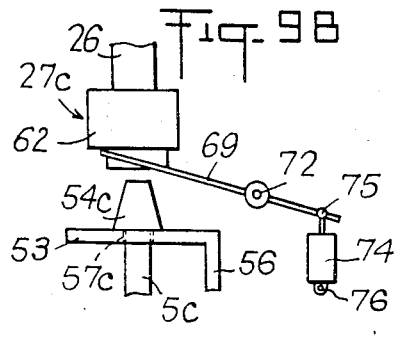
Figure 9C:
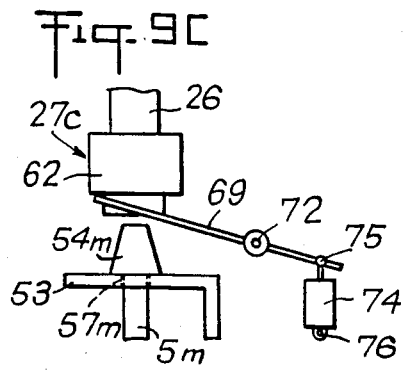

The particular instructions actuate comb 69 to swivel to its raised position (FIG. 9B). Slide 21 being immobilized, sleeve 61 rises and chuck 27c releases drill 5c.

The particular instructions again activate numerical axes Y and Z to raise slide 21 and carriage 16 advances to hole 57m containing the new tool to be chucked 5m; then slide 21 comes down.

The flange 68 of chuck 27c sleeve 61 meets with the comb 69 is raised position (FIG. 9c) and lowering of slide 21 and thus of the chuck body 58 relative to the fixed flange continues until unlocking is accomplished; in this position, body 58 hugs the tapered shank 54 of the new tool 5m to be chucked.

Figure 9D:
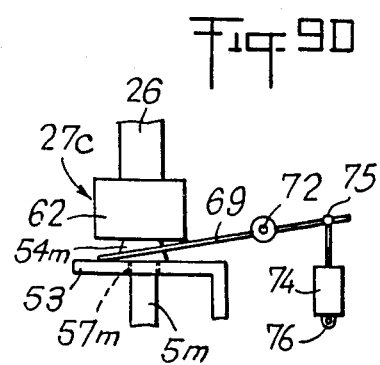

The particular instructions then call upon the comb 69 to swivel to lowered position (FIG. 9D). Sleeve 61 slides down and locks the chuck 27c on tool 5m.

Numerical axes Y and Z are once more controlled by particular instructions to raise the slide 21 and traverse carriage 16 back towards the structural section 2.

The invention is not limited to the specific embodiment which has been illustrated and described in detail herein, as various modifications can be expected to occur to persons skilled in the art without leaving the scope of the invention. Most notably, machining operations other than drilling can be easily accommodated by the invention.

I claim:

1. Apparatus for machining holes in a workpiece including in combination a machining station, means for moving the workpiece to a predetermined position relative to the station along an X axis of a coordinate system having mutually orthogonal X and Y and Z axes, means operable during hole machining to maintain the workpiece at said X position, the station including a plurality of tools rotating about axes disposed in the YZ plane, each tool having a hole machining end, the rotational axes of the tools intersecting at a point and the hole machining ends extending away from said point, first means for translating the tools along the Y axis, second means for translating the tools along the Z axis, means for swiveling the tools about said point to select one tool for hole machining duty and to orient the selected tool such that its rotational axis makes a predetermined angle relative to the Z axis, means operable during hole machining to translate the selected tool along its rotational axis by simultaneously controlling the first and second means to produce incremental Y and Z translations, and a probe mounted for concomitant Y and Z translation with the tools and adapted to engage the workpiece and provide a signal indicating the relative positioning between workpiece and tools.

2. Apparatus for machining holes in a workpiece including in combination a machining station, means for moving the workpiece to a predetermined position relative to the station along an X axis of a coordinate system having mutually orthogonal X and Y and Z axes, means operable during hole machining to maintain the workpiece at said X position, the station including a plurality of tools rotating about axes disposed in the YZ plane, each tool having a hole machining end, the rotational axes of the tools intersecting at a point and the hole machining ends extending away from said point, first means for translating the tools along the Y axis, second means for translating the tools along the Z axis, means for swiveling the tools about said point to select one tool for hole machining duty and to orient the selected tool such that its rotational axis makes a predetermined angle relative to the Z axis, means operable during hole machining to translate the selected tool along its rotational axis by simultaneously controlling the first and second means to produce incremental Y and Z translations, and a probe adapted to be engaged by a tool and to provide a signal indicating the true length of said tool along its rotational axis.

3. Apparatus for machining holes in a workpiece including in combination a machining station, means for moving the workpiece to a predetermined position relative to the station along an X axis of a coordinate system having mutually orthogonal X and Y and Z axes, means operable during hole machining to maintain the workpiece at said X position, the station including a plurality of tools rotating about axes disposed in the YZ plane, each tool having a hole machining end, the rotational axes of the tools intersecting at a point and the hole machining ends extending away from said point, first means for translating the tools along the Y axis, second means for translating the tools along the Z axis, means for swiveling the tools about said point to select one tool for hole machining duty and to orient the selected tool such that its rotational axis makes a predetermined angle relative to the Z axis, means operable during hole machining to translate the selected tool along its rotational axis by simultaneously controlling the first and second means to produce incremental Y and X translations, a magazine having a first and a second storage compartment, a further tool disposed in the second compartment, the swivelling means including a controllable chuck, and means including the first and second means and the chuck for sequentially depositing one tool of said plurality in the first compartment and withdrawing the further tool from the second compartment.

4. Apparatus for machining holes in a workpiece including in combination a machining station, means for moving the workpiece to a predetermined position relative to the station along an X axis of a coordinate system having mutually orthogonal X and Y and Z axes, means operable during hole machining and comprising a controllable clamp for maintaining the workpiece at said X position, the station including a plurality of tools rotating about axes disposed in the YZ plane, each tool having a hole machining end, the rotational axes of the tools intersecting at a point and hole machining ends extending away from said point, first means for translating the tools along the Y axis, second means for translating the tools along the Z axis, means for swiveling the tools about said point to select one tool for hole machining duty and to orient the selected tool such that its rotational axis makes a predetermined angle relative to the Z axis, and means operable during hole machining to translate the selected tool along its rotational axis by simultaneously controlling the first and second means to produce incremental Y and Z translations.

5. Apparatus for machining holes in a workpiece including in combination a machining station, means for moving the workpiece to a predetermined position relative to the station along an X axis of a coordinate system having mutually orthogonal X and Y and Z axes, the X and Y axes being horizontal and the Z axis being vertical, means operable during hole machining to maintain the workpiece at said X position, the station including a plurality of tools rotating about axes disposed in the YZ plane, each tool having a hole machining end, the rotational axes of the tools intersecting at a point and the hole machining ends extending away from said point, first means for translating the tools along the Y axis, second means for translating the tools along the Z axis, the second means being mounted upon the first means, means for swivelling the tools about said point to select one tool for hole machining duty and to orient the selected tool such that its rotational axis makes a predetermined angle relative to the Z axis, the swivelling means including a plurality of spindles rotating about axes disposed in the YZ plane, the spindle axes intersecting at said point and being spaced by equal angles, and means operable during hole machining to translate the selected tool along its rotational axis by simultaneously controlling the first and second means to produce incremental Y and Z translations.

6. Apparatus as in claim 1, 2, 3, 4 or 5 wherein said predetermined angle includes angles in a first region extending from 0° through at least +90° and angles in a second region extending from 0° through at least −90°.

7. Apparatus as in claim 1, 2, 3, 4 or 5 wherein the ratio of incremental Y and Z translations is equal to a trigonometric function of said angle.

8. Apparatus as in claim 1, 2, 3, 4 or 5 wherein a selected tool is selectively swivelled to a 0° angle, wherein a selected tool is selectively swivelled to a different angle, wherein at the 0° angle the second means is controlled to produce some incremental Z translation and the first means is controlled to produce no incremental Y translation, and wherein at said different angle the first means is controlled to produce some incremental Y translation and the second means is controlled to produce predetermined incremental Z translation.

9. Apparatus as in claim 1, 2, 3, 4 or 5 wherein a selected tool is selectively swivelled to a ±90° angle, wherein a selected tool is selectively swivelled to a different angle, wherein at the ±90° angle the first means is controlled to produce some incremental Y translation and the second means is controlled to produce no incremental Z translation, and wherein at said different angle the second means is controlled to produce some incremental Z translation and the first means is controlled to produce predetermined incremental Y translation.

* * * * *

UNITED STATES PATENT AND TRADEMARK OFFICE
CERTIFICATE OF CORRECTION

PATENT NO. : 4,706,373
DATED      : November 17, 1987
INVENTOR(S) : François Andriussi It is certified that error appears in the above–identified patent and that said Letters Patent are hereby corrected as shown below:

Column 11, line 65; "X" should read --Z--.

Signed and Sealed this

Fifth Day of April, 1988

Attest:

Attesting Officer

DONALD J. QUIGG

Commissioner of Patents and Trademarks